(12) United States Patent
Zhang

(10) Patent No.: US 11,316,916 B2
(45) Date of Patent: Apr. 26, 2022

(54) PACKET PROCESSING METHOD, RELATED DEVICE, AND COMPUTER STORAGE MEDIUM

(71) Applicant: Huawei Technologies Co., Ltd., Shenzhen (CN)

(72) Inventor: Wanguang Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/104,777

(22) Filed: Nov. 25, 2020

(65) Prior Publication Data

US 2021/0084100 A1 Mar. 18, 2021

Related U.S. Application Data

(63) Continuation of application No. PCT/CN2019/098055, filed on Jul. 27, 2019.

(30) Foreign Application Priority Data

Oct. 24, 2018 (CN) ............ 201811246024.X

(51) Int. Cl.
*G06F 15/16* (2006.01)
*H04L 67/1004* (2022.01)
*H04L 67/63* (2022.01)
*H04L 69/22* (2022.01)

(52) U.S. Cl.
CPC ........ *H04L 67/1004* (2013.01); *H04L 67/327* (2013.01); *H04L 69/22* (2013.01)

(58) Field of Classification Search
CPC . H04L 67/1002; H04L 67/22; H04L 41/5009; H04L 47/20; H04L 67/1029; H04L 67/1004
USPC ................. 709/227, 229; 370/329
See application file for complete search history.

(56) References Cited

U.S. PATENT DOCUMENTS

| 2008/0280623 | A1 | 11/2008 | Danne et al. | |
|---|---|---|---|---|
| 2010/0281178 | A1* | 11/2010 | Sullivan | H04N 21/2665 709/231 |
| 2012/0246258 | A1 | 9/2012 | Zhang | |
| 2014/0337417 | A1* | 11/2014 | Park | H04L 29/08234 709/203 |
| 2021/0084100 | A1 | 3/2021 | Zhang | |
| 2021/0084537 | A1 | 3/2021 | Zhang et al. | |

FOREIGN PATENT DOCUMENTS

| CN | 101783771 A | 7/2010 |
|---|---|---|
| CN | 103139246 A | 6/2013 |
| CN | 103166870 A | 6/2013 |
| CN | 103457869 A | 12/2013 |
| CN | 106101232 A | 11/2016 |
| CN | 106302565 A | 1/2017 |

(Continued)

*Primary Examiner* — Wing F Chan
*Assistant Examiner* — Andrew Woo
(74) *Attorney, Agent, or Firm* — Conley Rose, P.C.

(57) ABSTRACT

A packet processing method includes: receiving, by a load balancing apparatus, a data packet sent by a UE; when the data packet includes historical association information, selecting, by the load balancing apparatus based on the historical association information, a service instance used to process the data packet; and sending, by the load balancing apparatus, the data packet to the selected service instance.

15 Claims, 4 Drawing Sheets

(56) References Cited

FOREIGN PATENT DOCUMENTS

| CN | 107070983 | A  | 8/2017 |
|----|-----------|----|--------|
| CN | 107786669 | A  | 3/2018 |
| CN | 108134828 | A  | 6/2018 |
| CN | 108156086 | A  | 6/2018 |
| CN | 108449282 | A  | 8/2018 |
| CN | 109361749 | A  | 2/2019 |
| WO | 2011088725 | A1 | 7/2011 |
| WO | 2016090921 | A1 | 6/2016 |

* cited by examiner

| Source port number field | | Destination port number field |
|---|---|---|
| Sequence number field | | |
| Acknowledgment sequence number field | | |
| Data offset field | Reserved field | Control bit field | Window size field |
| Checksum field | | Urgent pointer field |
| Optional data field | | |
| Data | | |

| Type | Length | Value |
|---|---|---|

PACKET PROCESSING METHOD, RELATED DEVICE, AND COMPUTER STORAGE MEDIUM

CROSS-REFERENCE TO RELATED APPLICATION

This is a continuation of Int'l Patent App. No. PCT/CN2019/098055 filed on Jul. 27, 2019, which claims priority to Chinese Patent App. No. 201811246024.X filed on Oct. 24, 2018, both of which are incorporated by reference.

TECHNICAL FIELD

The disclosure relates to the field of communications technologies, and in particular, to a packet processing method, a related device, and a computer storage medium.

BACKGROUND

With continuous development and popularization of a cloud computing technology, advantages of the cloud computing technology in terms of high availability of services and scalability of processing capabilities become more prominent. Platform as a service (PaaS), as an important service of cloud computing, can accelerate development, deployment, test, and rollout of an application. A load-balancing service (LBS) is a core service provided by a PaaS platform. A load status of a service instance (also referred to as a pod) at a backend of the platform may be detected, and load balancing may be performed by using a scheduling policy.

In practice, there are existing scheduling policies, and the LBS may randomly select any one of the scheduling policies to implement load balancing of the pod. For example, the LBS selects a round robin scheduling policy to enable each pod to process a service, which cannot meet an actual communication requirement of a specific service, for example, a delay-sensitive service, or a multi-person network conference service or a multi-person network game service that needs to be scheduled, based on a service, to a same pod for processing. In addition, a delay and complexity of service communication may be increased, and service performance is affected.

SUMMARY

Embodiments disclose a packet processing method, a related device, and a computer storage medium, to resolve a problem that an actual communication requirement of a specific service cannot be met.

According to a first aspect, a packet processing method includes: receiving, by a load balancing apparatus, a data packet sent by a user equipment (UE), where the data packet is used to request to process a service. The data packet may include historical association information, which is used to determine whether a service instance bound to the historical association information exists. A quantity of the service instances is not limited, and there may be one or more service instances. When there are service instances, the plurality of service instances may form a service instance set. Further, when the data packet includes the historical association information, the load balancing apparatus selects, based on the historical association information, the service instance used to process the data packet. Further, the load balancing apparatus sends the data packet to the selected service instance for processing.

By implementing the embodiments, the service instance used to process the data packet may be selected based on the historical association information in the data packet, to resolve a problem that a communication requirement of a specific service cannot be met.

With reference to the first aspect, in a first possible implementation of the first aspect, if load of a service instance bound to the historical association information does not exceed a load threshold, the service instance bound to the historical association information is selected. There are two possible implementation situations. In a first implementation situation, if one service instance is bound to the historical association information, and the load of the service instance does not exceed the load threshold, the service instance bound to the historical relationship information is selected as the service instance used to process the data packet.

In a second implementation situation, if there are a plurality of service instances bound to the historical association information, and there are service instances whose load does not exceed the load threshold in the plurality of service instances, one service instance is selected from the service instances whose load does not exceed the threshold as the service instance used to process the data packet.

With reference to the first aspect or the first possible implementation of the first aspect, in a second possible implementation of the first aspect, if a load of a service instance bound to the historical association information exceeds a load threshold, a new service instance is selected. Specifically, if one or more service instances are bound to the historical association information, and load of each service instance exceeds the load threshold, the load balancing apparatus may select a new service instance as the service instance used to process the data packet.

With reference to the first aspect or the first or the second possible implementation of the first aspect, in a third possible implementation of the first aspect, when the data packet does not include the historical association information, the load balancing apparatus may select, according to a preset load balancing rule, a new service instance as the service instance used to process the data packet.

With reference to the first aspect or the first to the third possible implementations of the first aspect, in a fourth possible implementation of the first aspect, the historical association information is used to identify a user or used to identify a service.

According to a second aspect, a load balancing apparatus includes a functional module or a unit configured to perform the method described in the first aspect or any possible implementation of the first aspect.

According to a third aspect, a load balancing apparatus includes a processor and a memory. When executing an instruction in the memory, the load balancing apparatus performs the method described in the first aspect or any possible implementation of the first aspect.

Optionally, the apparatus may further include a communications interface and a bus. The processor, the communications interface, and the memory communicate with each other through a bus. The communications interface is configured to receive and send data. The memory is configured to store the instruction. The processor is configured to invoke the instruction in the memory, to perform the method described in the first aspect or any possible implementation of the first aspect.

According to a fourth aspect, a computer non-transitory storage medium is provided. The computer non-transitory storage medium stores program code used for packet processing. The program code includes an instruction used to perform the method described in the first aspect or any possible implementation of the first aspect.

According to a fifth aspect, a chip product is provided, to perform the method in the first aspect or any possible implementation of the first aspect.

The implementations may be further combined to provide more implementations.

BRIEF DESCRIPTION OF DRAWINGS

To describe the technical solutions in the embodiments more clearly, the following briefly describes the accompanying drawings for describing the embodiments.

DETAILED DESCRIPTION

The following describes the embodiments with reference to accompanying drawings.

To resolve a problem that a communication requirement of a specific service cannot be met and a service communication delay or complexity is relatively high, the disclosure provides a packet processing method, a network framework and a related device to which the method is applicable.

Figure 1:
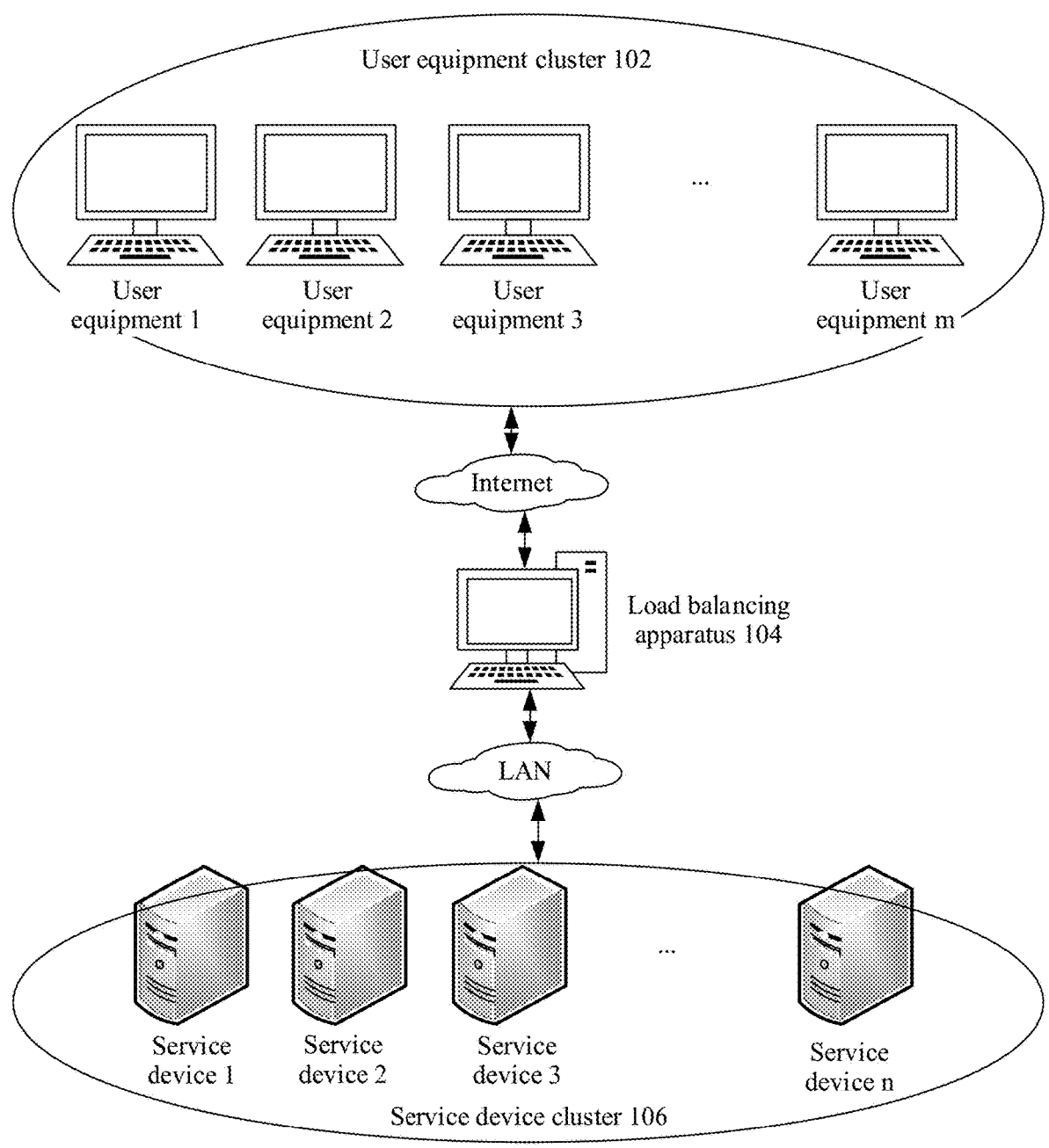
FIG. 1 is a schematic diagram of a network framework according to an embodiment.

First, a schematic diagram of a network framework to which the present disclose is applicable is described. FIG. 1 is a schematic diagram of a network framework according to an embodiment. A network framework 100 shown in FIG. 1 includes a UE cluster 102, a load balancing apparatus 104, and a service device cluster 106.

The UE cluster 102 includes one or more UEs. In the figure, m UEs are used as an example, and m is a positive integer. The service device cluster 106 includes one or more service devices. In the figure, n service devices are used as an example, and n is a positive integer.

The m UEs in the UE cluster 102 are deployed in an external network, and the external network may be the Internet. The UE 102 includes but is not limited to a mobile phone, a tablet computer, a personal digital assistant (PDA), a mobile Internet device (MID), a wearable device, and another device that supports network communication, and the like.

The n service devices in the service device cluster 106 are deployed in an internal network, and the internal network may be a local area network (LAN). The service device is a device configured to provide a business service. The n service devices in the service device cluster may support providing of a same business service, or may support providing of different business services.

The service device is a device on which one or more service instances (pods) are deployed. The service instance is used to provide the business service, for example, a voice service, a video service, a network conference service, and a session service. Each of the n service devices in the service device cluster is deployed with a service instance used to provide a same business service. For example, all the n service devices are used to provide a network session service. In actual application, the service device may be a hardware device, or may be a functional module implemented by a software program. The service device includes but is not limited to a server, a host, a virtual machine, a container, and the like.

The load balancing apparatus 104 is deployed in a demilitarized zone (DMZ), and is configured to implement load balancing of the UE. Specifically, the load balancing apparatus allocates, through a preset scheduling policy, a service request (or a data packet that carries the service request) sent by the UE to any one or more of the n service devices for processing, to avoid a situation that a service communication delay is relatively long and service performance and user experience are affected due to heavy load of some service devices.

Space between two firewalls is referred to as a DMZ. It can also be regarded as a special network area different from the external network or the internal network. The DMZ is usually deployed with devices that do not contain confidential information, such as web servers, mail servers, and load-balancing (LB) devices.

In an actual communication process, the UE in the UE cluster 102 may communicate with the load balancing apparatus 104 through the external network, and the service device in the service device cluster 104 may communicate with the load balancing apparatus 104 through the internal network.

A scheduling policy is used to implement scheduling or allocation of the service request. The scheduling policy may also be referred to as a load balancing policy or a load balancing rule, and may be customized by a system. In a conventional technology, there are 10 scheduling policies.

(1) Round-Robin (RR) Scheduling

The round robin scheduling refers to scheduling the service request to different service instances, which may be any service instance deployed in the service device, in a sequential and cyclic manner. In actual application, request processing capabilities of all service instances are usually the same, and the load balancing apparatus may evenly allocate all service requests to the service instances for processing.

(2) Weight-RR (WRR) Scheduling

The weight round robin scheduling is mainly an optimization and a supplement to the round robin scheduling. The load balancing apparatus considers performance of each service instance, and allocates a weight value to each service instance. The weight value is used to reflect a service request processing capability of the service instance. A service instance with a larger weight value processes more service requests. For example, if a weight value of a service instance A is 1, and a weight value of a service instance B is 2, service requests scheduled by the load balancing apparatus to the service instance B is twice that of the service instance A.

(3) Least-Connection (LC) Scheduling

The least-connection scheduling means that a service request of new UE is allocated to a service instance with least connections. The least-connection scheduling is a dynamic scheduling algorithm, and a status of a service instance is estimated through a quantity, which may also be referred to as a quantity of connections, of UEs currently connected to the service instance through communication. The load balancing apparatus records a quantity of connections of the service instance. When a service request of UE is scheduled to the service instance, the quantity of connections of the service instance is increased by 1. When the connection is interrupted or times out, the quantity of connections of the service instance is decreased by 1.

(4) Weight-LC Scheduling

The weight least-connection scheduling is an optimization of the least-connection scheduling. Each service instance is configured with a weight value, which indicates processing performance of the service instance. A default weight value of the service instance is 1. The system can dynamically adjust the weight value of the service instance. In a scheduling process, when scheduling a service request of the UE, the load balancing apparatus makes a quantity of connections of the service instance proportional to a weight value of the service instance as much as possible. The load balancing apparatus may automatically obtain a load status of the service instance, and dynamically adjust the weight value of the service instance.

(5) Locality-Based Least Connections (LBLC)

The LBLC is load balancing scheduling for a target Internet Protocol (IP) address of a data packet of a service request, and is mainly applied to a cache cluster system, because a target IP address of a data packet of UE in the system is variable. It is assumed that each service instance can process any service request. A design objective of the LBLC is to schedule service requests with a same target IP address to a same service instance for processing when load of the service instance is balanced, to improve service processing efficiency and performance.

Specifically, the LBLC first finds, based on the target IP address of the service request, a service instance recently used by the target IP address, and if the service instance is available and is not overloaded (a load amount is less than or equal to a preset threshold), sends the service request to the service instance for processing. If the service instance does not exist, or the service instance is overloaded and has half or more workload, an available service instance is selected based on a "least connections" principle, and the service request is sent to the service instance for processing.

(6) LBLC with Replication (LBLCR)

The LBLCR is also used for the load balancing of the target IP address and applies to the cache cluster system. A difference between the LBLC and the LBLCR is that the LBLC maintains a mapping between a target IP address and a service instance while the LBLCR maintains a mapping between a target IP address and a group of service instances. Specifically, the LBLCR selects, according to the "least connections" principle, a service instance from a service instance group corresponding to the target IP address, and if the service instance is not overloaded, sends the service request of the UE to the service instance for processing. If the service instance is overloaded, a service instance is selected from a service instance cluster according to the "least connections" principle, and the selected service instance is added to the service instance group corresponding to the target IP address, so that the service request may be further sent to the service instance for processing. In addition, when the service instance group is not modified for a period of time, a busiest (with largest load) service instance in the service instance group may be deleted, to reduce a replication degree, to be specific, reduce a probability that the service instance is repeatedly selected for processing a service request.

(7) Destination-Hashing (DH) Scheduling

The DH uses the target IP address of the service request as a hash key to search for a service instance corresponding to the hash key in a static allocation hash list. If the service instance is available and not overloaded, the DH schedules the service request to the service instance for processing. Otherwise, no result is returned and the process ends.

(8) Source-Hashing (SH) Scheduling

The SH uses a source IP address of the service request as a hash key to search for a service instance corresponding to the hash key in a static allocation hash list. If the service instance is available and not overloaded, the SH schedules the service request to the service instance for processing. Otherwise, no result is returned and the process ends.

(9) Shortest Expected Delay (SED)

The SED is a scheduling algorithm based on the weight least connections (WLC). For example, it is assumed that three service instances are respectively A, B, and C. The weight values of the three service instances are respectively 1, 2, and 3. If the WLC is used to schedule a service request, a new service request may be scheduled to any one of the service instances A, B, and C. When the SED is used to schedule, the following formula is used to calculate a calculation result corresponding to the service instance: (1+weight value)/weight value. Here, A: (1+1)/1=2; B: (1+2)/2=1.5; and C: (1+3)/3=4/3. Correspondingly, the SED sends the service request to the service instance C whose calculation result is the smallest for processing.

(10) Never-Queue (NQ) Scheduling

The NQ is a scheduling algorithm that does not require queuing. If a quantity of connections of a service instance is equal to 0, the load balancing apparatus schedules the service request of the UE to the service instance for processing, and does not need to perform a SED calculation.

Figure 2:
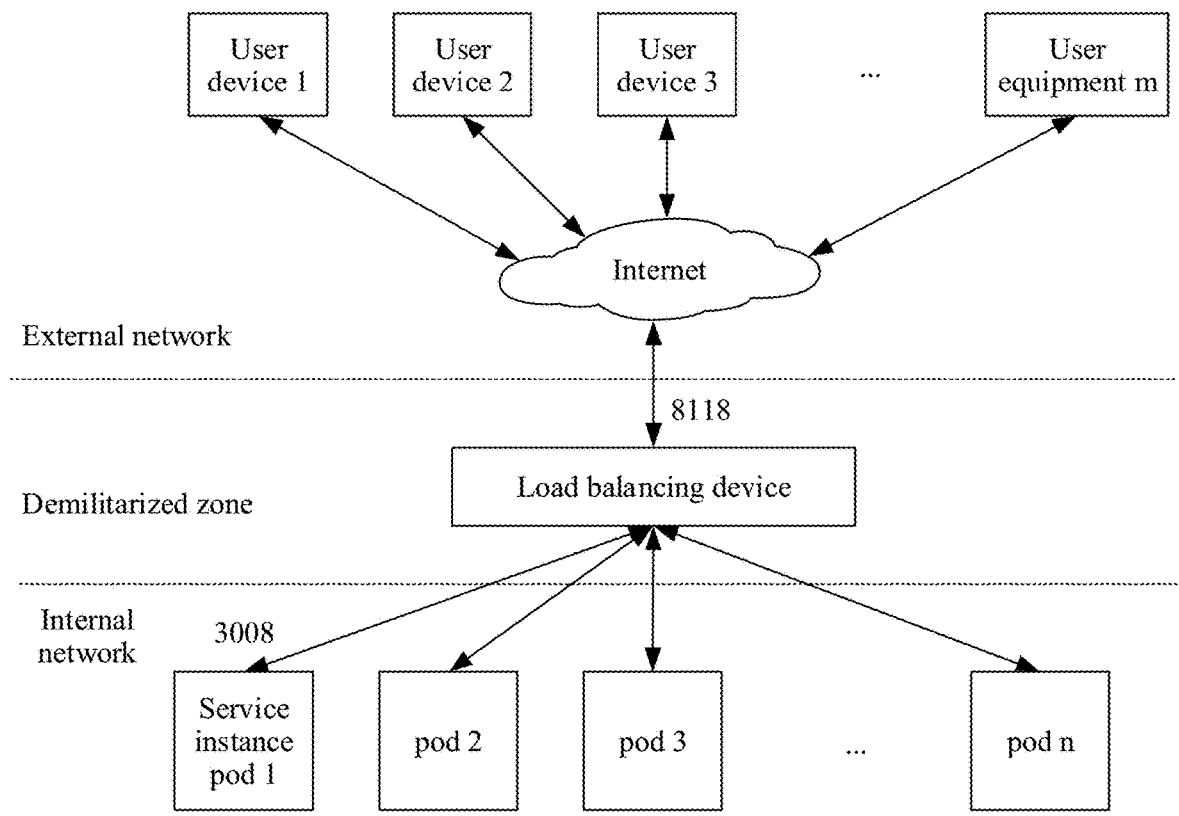
FIG. 2 is a schematic diagram of a scenario according to an embodiment.

Second, a schematic diagram of a scenario to which the disclosure is applicable is described. FIG. 2 is a schematic diagram of a scenario according to an embodiment. In the scenario shown in FIG. 2, m UEs, one load balancing apparatus, and n service instances (pods) are shown. The m UEs are deployed in an external network, the load balancing apparatus is deployed in a demilitarized zone DMZ, and the n service instances are deployed in an internal network. Each service instance provides a corresponding business service, for example, a conference service, a WeChat service, or a game service. Business services provided by any two of the n service instances may be the same or may be different. Optionally, the n service instances shown in the disclosure are located in a same service instance set, and are all used to provide a same business service.

In an open source platform Kubernetes, a service instance pod is a basic functional unit or module. A pod includes a group of containers and volumes shared by the group of containers, and is used to provide a corresponding functional service. Each pod is assigned a unique IP address for communication.

As shown in FIG. 2, in an actual communication process, the UE communicates with the load balancing apparatus through the external network, for example, sends a service request, or a data packet that carries the service request, of the UE to the load balancing apparatus. The load balancing apparatus communicates with the service instance through the internal network, for example, schedules the service request of the UE to the service instance for processing.

The load balancing apparatus is configured with a corresponding communications port. The communications port is configured to transmit a data packet of a specific service, and the specific service is one or more services customized by a system. Optionally, for communication of different services, the load balancing apparatus may be configured with different communications ports, to process communication requests of different services.

The communications port may be a port integrating a receiving function and a sending function. For example, the port may be configured to receive a data packet sent by the UE, and may also be configured to send the data packet to the service instance. Alternatively, the communications port may include a first port and a second port, and the first port is configured to communicate with the UE, for example, receive the data packet sent by the UE. The second port is configured to communicate with the service instance, for example, send the data packet to the service instance.

For example, as shown in FIG. 2, it is assumed that the load balancing apparatus is configured with two ports. The first port is configured to communicate with UE that supports a network conference service, and the second port is configured to communicate with a service instance pod that supports processing of the network conference service. As shown in the figure, a port number of the first port is 8118, and a port number of the second port is 3008. In a communication process of the network conference service, UE 1 (user 1) sends a service request to the load balancing apparatus through the external network. The load balancing apparatus receives, through the port 8118, the service request sent by the UE 1, and further sends the service request to a pod 1 through a preset scheduling policy. Specifically, the load balancing apparatus sends the service request to the pod 1 whose IP address is 172.1.0.1. Correspondingly, the pod 1 receives, through the port 3008, the service request sent by the load balancing apparatus, and further processes the service request. For details of the scheduling policy, refer to related descriptions in the foregoing embodiment. Details are not described herein again.

Figure 3:
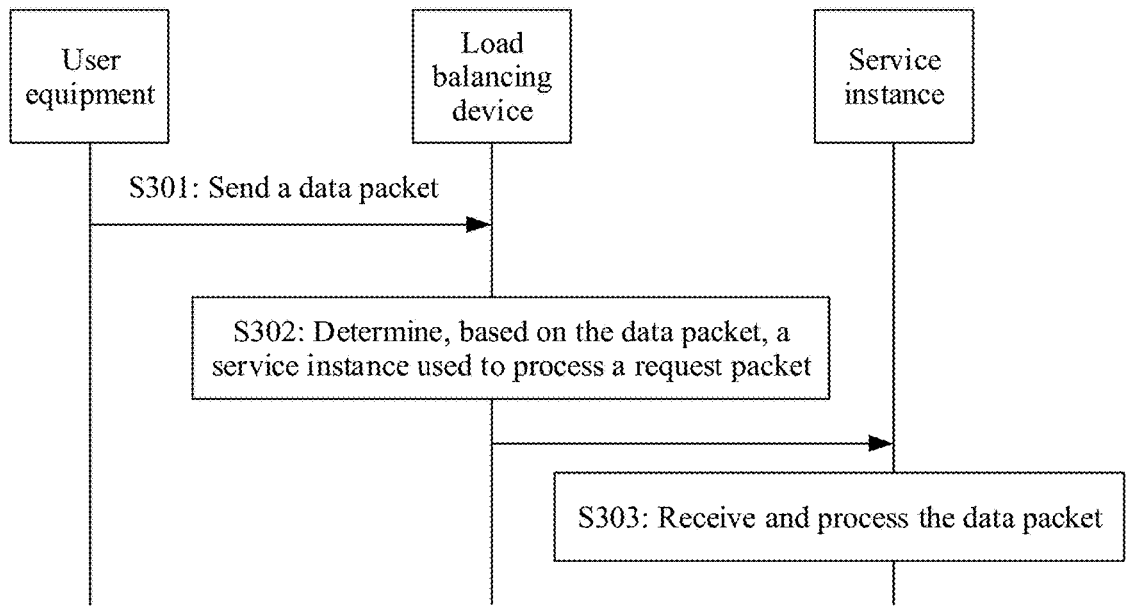
FIG. 3 is a schematic flowchart of a packet processing method according to an embodiment.

FIG. 3 is a schematic flowchart of a packet processing method according to an embodiment. The method shown in FIG. 3 includes the following implementation steps.

Step S301: UE sends a data packet to a load balancing apparatus. Correspondingly, the load balancing apparatus receives the data packet sent by the UE.

In a service communication process, the UE may send the data packet to the load balancing apparatus. The data packet is used to request to process a service, in other words, request to provide a business service required for processing the service. The business service includes but is not limited to a network conference service, a call service, a game service, and the like. The data packet may carry historical association information, and the historical association information may be used to identify a user or UE or identify a service or business service. The historical association information is used to determine whether there is a service instance bound to the historical association information. A quantity of the service instances is not limited. When there is more than one service instance, the more than one service instance may also be referred to as a service instance set. For details about the service instance, refer to related descriptions in the foregoing embodiment. Details are not described herein again. In an example, the historical association information is used to identify the UE, and the historical association information may be a name, a model, an identity (ID) number used to represent the UE, other key information used to distinguish the UE, or the like. Specifically, there are the following several possible implementations.

In a first implementation, the UE may be associated and bound to a service instance in advance, so that the service instance is subsequently used to process the data packet of the UE. For example, the data packet sent by the UE carries the historical association information, and the historical association information is used to identify the UE. In this case, the load balancing device may search for a corresponding service instance based on the historical association information, to send the data packet to the found service instance for processing.

In a second implementation, a same UE cluster may be associated and bound to a service instance in advance, so that the service instance is subsequently used to process a data packet of any UE in the UE cluster.

In a third implementation, a same UE cluster may be associated and bound to a service instance cluster in advance, and the service instance cluster includes a plurality of service instances, so that the service instance in the service instance cluster is subsequently used to process a data packet of any UE in the UE cluster. Each service instance in the service instance cluster may provide a same business service, to process a data packet of each UE in the UE cluster for the business service. How any UE selects a service instance from the service instance cluster to process the data packet of the UE is described in detail in the following S302.

The UE cluster includes one or more UEs, and each UE included in the UE cluster may be customized by a system. For example, each UE in the UE cluster needs to meet any one of or a combination of a plurality of the following conditions. (1) Each UE in the UE cluster corresponds to same historical association information. (2) The historical association information corresponding to all UEs in the UE cluster belongs to a same type. In other words, the system may group a plurality of UEs that have the historical association information of a same type into one UE cluster. The type to which the historical association information belongs may also be understood as a type of UE corresponding to the historical association information, for example, a television device or an ultrasonic diagnostic device. (3) A similarity between the historical association information of all UEs in the UE cluster is greater than or equal to a preset similarity. The preset similarity is customized by the system, for example, is set based on an empirical value, or is obtained through statistics collection based on some experimental data. In other words, the system may group a plurality of UEs corresponding to historical association information with a relatively close similarity into a UE cluster.

In an example, the historical association information is used to identify a business service, and the historical association information may be information such as a name, a function description, and a number that are used to represent the business service. Specifically, the system may bind a service instance or a service instance set to a same business service or a same type of business service (which may be a same business or a same type of business) in advance, to process a data packet sent by a UE of the business service by using the service instance or a service instance in the service instance set.

Step S302: The load balancing apparatus determines, based on the data packet, a service instance used to process the data packet.

Step S303: The load balancing apparatus sends the data packet to the determined service instance. Correspondingly, the service instance receives and processes the data packet.

The following describes several specific implementations involved in the step S302.

In a possible implementation, the data packet includes the historical association information, and the historical association information is used to determine whether there is a service instance correspondingly bound to the historical association information. After receiving the data packet, the load balancing apparatus may determine, based on the historical association information included in the data packet, whether the service instance corresponding to the historical association information exists.

Specifically, the load balancing apparatus may query, based on the historical association information in the data packet, a historical allocation record to determine whether the service instance corresponding to the historical association information exists. The historical allocation record is used to record whether the corresponding service instance is allocated for the historical association information. The historical allocation record may be stored locally in a form of a table, a text, an array, or the like in the load balancing apparatus, or stored in a preset database. A database is used as an example. The database may be a database deployed locally in the load balancing apparatus, or may be a database deployed in another device such as a cloud server.

If there is the service instance correspondingly bound to the historical association information, the load balancing apparatus may further determine whether load of the bound service instance is greater than or equal to a load threshold. When the load is less than the load threshold, it is determined that the bound service instance is not overloaded, and the bound service instance is determined as the service instance used to process the data packet. When the load is greater than or equal to the load threshold, it is determined that the bound service instance is overloaded, and the load balancing apparatus may select a new service instance as the service instance used to process the data packet. For example, the load balancing apparatus may select, from a service instance set other than the bound service instance (the service instance included in the service instance set and the bound service instance provide a same function or business service), a service instance with minimum load as the service instance used to process the data packet. Alternatively, the load balancing apparatus may randomly select a new service instance or select a new service instance through a preset first scheduling policy, and use the new service instance as the service instance used to process the data packet. The first scheduling policy is customized by the system, for example, the round robin scheduling policy described above.

If there are service instances (namely, a service instance cluster) correspondingly bound to the historical association information, all service instances in the plurality of service instances support processing of a data packet of a same service (which may be a data packet of UE or a business service identified by the historical association information).

Further, the load balancing apparatus may determine whether at least one service instance whose load is less than the load threshold exists in the plurality of service instances. If the at least one service instance whose load is less than the load threshold does not exist, the load balancing apparatus selects, from the service instance set (the service instance included in the service instance set and the plurality of bound service instances provide a same business service) other than the plurality of bound service instances through a preset scheduling policy, a new service instance as the service instance used to process the data packet. If the at least one service instance whose load is less than the load threshold exists, the load balancing apparatus may select one service instance from the at least one service instance as the service instance used to process the data packet. For example, the load balancing apparatus may randomly select one service instance from the at least one service instance as the service instance used to process the data packet. Alternatively, the load balancing apparatus may select, through a preset second scheduling policy, one service instance from the at least one service instance as the service instance used to process the data packet. The second scheduling policy is customized by the system, for example, a minimum load scheduling policy.

If there is no service instance bound to the historical association information, the load balancing apparatus may select, from the service instance set through a preset third scheduling policy, a new service instance as the service instance used to process the data packet. The service instance set includes one or more service instances, and all service instances support processing of the data packet of the UE or the business service identified by the historical association information. For details of the scheduling policy, refer to related descriptions in the foregoing embodiment. Details are not described herein again.

In another possible implementation, the data packet does not include the historical association information. In this case, the load balancing apparatus may select, from the service instance set through the preset third scheduling policy (which may also be referred to as a load balancing rule), a new service instance as the service instance used to process the data packet. For related descriptions of the service instance set, refer to the related descriptions in the foregoing embodiment. Details are not described herein again.

The first scheduling policy to the third scheduling policy in the foregoing descriptions may be all scheduling policies customized by the system, and may also be referred to as load balancing rules. The first scheduling policy to the third scheduling policy may be same or may be different. For details, refer to related descriptions of the scheduling policy in the foregoing embodiment. Details are not described herein again.

Correspondingly, in the step S303, after determining the service instance used to process the data packet, the load balancing apparatus may send the data packet received in the step S301 to the service instance. Correspondingly, the service instance receives the data packet, and processes the data packet to provide a business service requested by the data packet.

For example, a network conference service is used as an example, and it is assumed that the UE wants to join a network conference A. The UE sends a data packet to the load balancing apparatus, and the data packet is used to request a pod to provide a corresponding network conference service, so that the UE joins the network conference A. Correspondingly, after determining a service instance, the load balancing apparatus sends the data packet to the service instance, and the service instance is used to provide a network conference service related to the network conference A. Correspondingly, after receiving the data packet, the service instance may enable a thread related to the network conference service to provide the corresponding network conference service for the UE, so that the UE successfully joins the network conference A.

In a possible embodiment, when the load balancing apparatus selects a new service instance as the service instance used to process the data packet, the load balancing apparatus may send the new service instance and the historical association information to the database, to store an association binding relationship between the new service instance and the historical association information in the database. In other words, the database updates the historical allocation record, to associate the new service instance with the historical association information and store the new service instance and the historical association information in the database.

In a possible embodiment, in a service communication process, if a service of the UE is interrupted (for example, a fault occurs in a network or the UE is disconnected from communication), the load balancing apparatus may update load of the determined service instance, for example, subtract 1 from the load of the service instance. If the load of the service instance is 0, a historical allocation record of the service instance may be controlled to be deleted. Specifically, if the load balancing apparatus does not receive the data packet (which may be a response packet) of the UE within preset duration, the load balancing apparatus may determine that service interruption occurs on the UE. In this case, the load balancing apparatus may send a notification message to the database, and the notification message is used to indicate to update the historical allocation record of the determined service instance corresponding to the UE, for example, indicate to reduce the load of the service instance. Optionally, if the load of the service instance is 0, the database may directly delete the allocation record of the service instance, or the like.

In an optional embodiment, the historical association information may also be referred to as key information, and may be a keyword, a key value, a key word, or the like. The historical association information may be carried in a default field in the data packet, and the default field is a field customized by the system. For example, the data packet is a Transmission Control Protocol (TCP) packet, and the historical association information may be carried in an optional data field of the TCP packet. Optionally, the historical association information may be carried in the optional data field in a type-length-value (TLV) manner.

Figures 4, 5, 6:
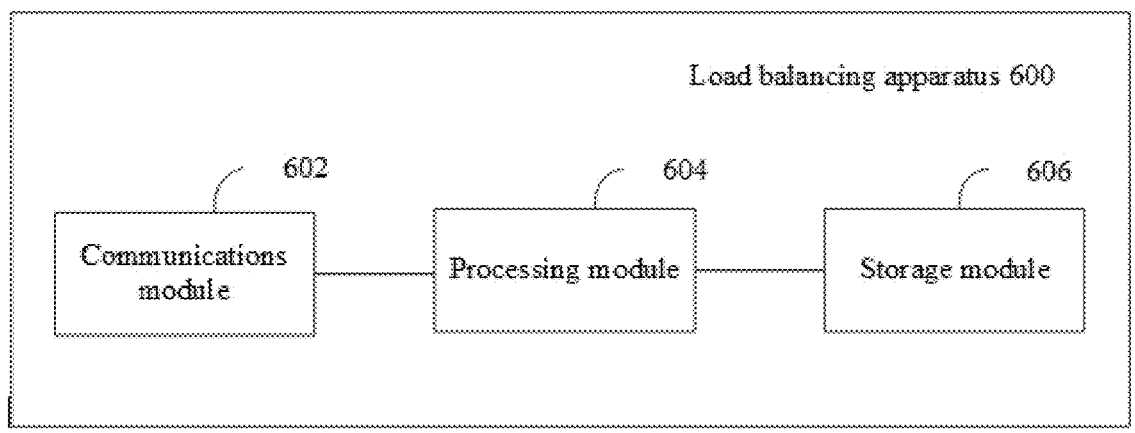
FIG. 4 is a schematic diagram of a packet format according to an embodiment.
FIG. 5 is a schematic diagram of a format of an optional field according to an embodiment.
FIG. 6 is a schematic diagram of a structure of a load balancing apparatus according to an embodiment.

FIG. 4 is a schematic diagram of a format of a TCP packet. The format of the TCP packet shown in FIG. 4 includes a TCP packet header and data. The TCP packet header includes a source port number field, a destination port number field, a sequence number field, an acknowledgment sequence (acksequence) number field, a data offset field, a reserved field, a control bit field with control flags, a window size field, a checksum, an urgent pointer, and an optional data field.

The source port number field occupies two bytes and identifies a return address of the packet.

The destination port number field occupies two bytes and indicates a receiving port (or application port) of a receive end.

The sequence number field occupies four bytes, is a key part of TCP reliable transmission, and indicates a sequence number of the first byte of the packet.

The acknowledgment sequence number field occupies four bytes, is a key part of the TCP reliable transmission, and indicates a sequence number of a next byte to be received.

The data offset field may also be referred to as a packet header length field, and occupies four bits, to indicate a length of the TCP packet header, in other words, where data starts from.

The reserved field occupies 3 bits and is reserved for defining a new function in the future.

The control bit field occupies nine bits and includes six flag bits. Each flag bit indicates a control function.

The window size field occupies two bytes and indicates remaining space of a current receive window of the receive end, which is used for TCP flow control.

The checksum field occupies two bytes and is used for parity check on the packet.

The urgent pointer field occupies two bytes and is valid only when an urgent pointer flag in the control bit field is 1. The urgent pointer field can be used as a padding field when the urgent pointer flag is not set.

The optional data field is a customized field, and a length of the optional data field needs to be an integer multiple of 32 bits. A format of the optional data field may be shown in FIG. 5, and the optional data field includes a type, a length, and a value. The type indicates a defined type of the optional data field, for example, type=historical context, identifies that the optional data field is defined as a historical association field, and indicates that the optional data field is used to carry the historical association information. The length defines a length of the historical association field, for example, two bytes. The value indicates the historical association information carried by the historical association field, for example, a keyword.

In an optional embodiment, the data packet may be a first-sent packet when the UE and the load balancing apparatus perform service communication. Specifically, to reduce complexity of the service communication or reduce communication traffic, in a service communication process, for example, in a service communication process in which a User Datagram Protocol (UDP) is used, the system may pre-agree on a specific format structure of the first-sent packet, in this way, the historical association information is carried in the first-sent packet. Correspondingly, in an actual service communication process, the UE sends the first-sent packet for the service request to the load balancing apparatus, and the first-sent packet includes historical association information. The load balancing apparatus may determine, based on the historical association information in the first-sent packet, the service instance used to process the service request, and then send the first-sent packet to the determined service instance for processing. It can be learned that in an entire service communication process, only a format of the first-sent packet needs to be redefined, and a format of a packet transmitted in a subsequent communication process is not changed. This helps reduce service communication complexity and packet construction complexity.

By implementing the embodiments, a problem that a service communication requirement cannot be met, a service communication delay is relatively long, and complexity is relatively high can be resolved, so that the service communication delay and complexity can be effectively reduced.

With reference to related descriptions in the foregoing embodiments in FIG. 1 to FIG. 5, the following describes related apparatuses. FIG. 6 is a schematic diagram of a structure of a load balancing apparatus according to an embodiment. The load balancing apparatus 600 includes a communications module 602 and a processing module 604. The processing module 604 may be configured to control and manage an action of the load balancing apparatus 600. For example, the processing module 604 is configured to perform the step S302 in FIG. 3, and/or configured to perform other content of the technology described in the text. The communications module 602 is configured to communicate with another module or device. For example, the communications module 602 is configured to perform the step S301 and the step S303 in FIG. 3, and/or is configured to perform other content of the technology described in the text.

Optionally, the load balancing apparatus 600 may further include a storage module 606. The storage module 606 is configured to store program code and data of the load balancing apparatus 600, for example, store program code used for packet processing. The processing module 604 is configured to invoke the program code in the storage module 606 to implement the implementation steps performed by the load balancing apparatus in the embodiment shown in FIG. 3, and/or other content steps used to perform the technology described in the text.

The processing module 604 may be a processor or a controller, such as a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof. The controller/processor may implement or execute various example logical blocks, modules, and circuits described with reference to content disclosed in the present disclosure. The processor may be a combination of processors implementing a computing function, for example, a combination of one or more microprocessors, or a combination of the DSP and a microprocessor. The communications module 602 may be a communications interface, a transceiver, a transceiver circuit, or the like. The communications interface is a general term, and may include one or more interfaces, for example, an interface between the communications module and the processing module, and an interface between the load balancing apparatus and UE. The storage module 606 may be a memory, or another service or module configured to provide a storage function.

Figure 7:
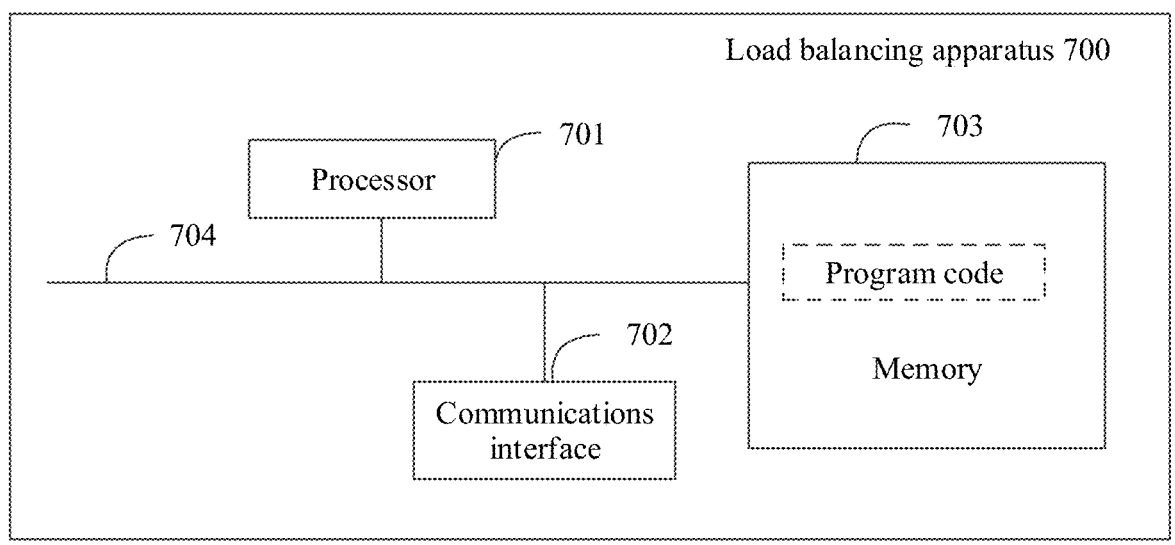
FIG. 7 is a schematic diagram of a structure of another load balancing apparatus according to an embodiment.

When the processing module 604 is a processor, the communications module 602 is a communications interface, and the storage module 606 is a memory, the load balancing apparatus may be a load balancing apparatus, or computing device, shown in FIG. 7.

Referring to FIG. 7, the load balancing apparatus 700 includes one or more processors 701, a communications interface 702, and a memory 703. The processor 701, the communications interface 702, and the memory 703 may be connected through a bus or in another manner. An example in which the processor 701, the communications interface 702, and the memory 703 are connected through a bus 704 is used.

The processor 701 may include one or more general-purpose processors, for example, a CPU. The processor 701 may be configured to run a program of any one or more of the following function modules in related program code: a communications module, a processing module, a storage module, and the like. In other words, the processor 701 may execute the program code to implement any one or more functions of the function modules such as the communications module and the processing module. For details about the communications module and the processing module, refer to related descriptions in the foregoing embodiments.

The communications interface 702 may be a wired interface (for example, an Ethernet interface) or a wireless interface (for example, a cellular network interface or a wireless local area network interface), and is configured to communicate with another module/device. For example, the communications interface 702 may be configured to: receive a data packet sent by UE, or send a data packet to a service instance.

The memory 703 may include a volatile memory, for example, a random-access memory (RAM). The memory may also include a non-volatile memory, for example, a read-only memory (ROM), a flash memory, a hard disk drive (HDD), or a solid-state drive (SSD). The memory 703 may further include a combination of the foregoing types of memories. The memory 703 may be configured to store a group of program code, so that the processor 701 invokes the program code stored in the memory 703 to implement functions of the communications module and/or the processing module.

It should be noted that FIG. 6 or FIG. 7 is merely a possible implementation of this embodiment of this application. In actual application, the load balancing apparatus may further include more or fewer components. For content that is not shown or not described, refer to related descriptions in the embodiment in FIG. 3.

An embodiment further provides a computer non-transient storage medium, the computer non-transient storage medium stores an instruction, and when the instruction is run on a processor, the method procedure shown in FIG. 3 is implemented.

An embodiment further provides a computer program product. When the computer program product runs on a processor, the method procedure shown in FIG. 3 is implemented.

Methods or algorithm steps described in combination with the content disclosed may be implemented by hardware, or may be implemented by a processor by executing a software instruction. The software instruction may include a corresponding software module. The software module may be stored in a RAM, a flash memory, a ROM, an erasable programmable ROM (EPROM), an electrically erasable programmable ROM (EEPROM), a register, a hard disk, a mobile hard disk, a compact disc ROM (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a computing device. Certainly, the processor and the storage medium may exist in the computer device as discrete components.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A packet processing method implemented by a load-balancing (LB) apparatus and comprising:

receiving a data packet from a user equipment (UE);
selecting, based on historical association information and when the data packet comprises the historical association information, a service instance to process the data packet, wherein the historical association information is a name, a model, or an identity (ID) number;
sending the data packet to the selected service instance; and
selecting a new service instance when a load of the selected service instance exceeds a load threshold.

2. The packet processing method of claim 1, further comprising further selecting the selected service instance when the load of the selected service instance does not exceed the load threshold.

3. The packet processing method of claim 1, further comprising selecting, according to a load balancing rule and when the data packet does not comprise the historical association information, the selected service instance.

4. The packet processing method of claim 1, wherein the historical association information identifies a user.

5. The packet processing method of claim 1, wherein the historical association information identifies a service.

6. A load-balancing (LB) apparatus comprising:
a memory configured to store instructions; and
a processor coupled to the memory and configured to execute the instructions to:
receive a data packet from a user equipment (UE);
select, based on historical association information and when the data packet comprises historical association information, a service instance to process the data packet, wherein the historical association information is a name, a model, or an identity (ID) number;
send the data packet to the selected service instance; and
select a new service instance when a load of the selected service instance exceeds a load threshold.

7. The LB apparatus of claim 6, wherein the processor is further configured to further select the selected service instance when the load of the selected service instance does not exceed the load threshold.

8. The LB apparatus of claim 6, wherein the processor is further configured to select, according to a load balancing rule and when the data packet does not comprise the historical association information, the selected service instance.

9. The LB apparatus of claim 6, wherein the historical association information identifies a user.

10. The LB apparatus of claim 6, wherein the historical association information identifies a service.

11. A computer program product comprising instructions for storage on a non-transitory medium and that, when executed by a processor, cause a load-balancing (LB) apparatus to:
receive a data packet from a user equipment (UE);
select, based on historical association information and when the data packet comprises historical association information, a service instance to process the data packet, wherein the historical association information is a name, a model, or an identity (ID) number;
send the data packet to the selected service instance; and
select a new service instance when a load of the selected service instance exceeds a load threshold.

12. The computer program product of claim 11, wherein the instructions further cause the LB apparatus to further select the selected service instance when the load of the selected service instance does not exceed the load threshold.

13. The computer program product of claim 11, wherein the instructions further cause the LB apparatus to select, according to a load balancing rule and when the data packet does not comprise the historical association information, the selected service instance.

14. The computer program product of claim 11, wherein the historical association information identifies a user.

15. The computer program product of claim 11, wherein the historical association information identifies a service.

* * * * *